United States Patent [19]

Nakasaki

[11] Patent Number: 5,058,643
[45] Date of Patent: Oct. 22, 1991

[54] ATV TIRE WITH ZIG ZAG LUGS

[75] Inventor: Eiji Nakasaki, Kakogawa, Japan

[73] Assignee: Sumitomo Rubber Industries, LTD, Hyogo, Japan

[21] Appl. No.: 433,799

[22] Filed: Nov. 8, 1989

[30] Foreign Application Priority Data

Nov. 9, 1988 [JP] Japan .................................. 63-283286

[51] Int. Cl.⁵ ............................................. B60C 11/08
[52] U.S. Cl. ............................. 152/209 B; 152/209 R; D12/151
[58] Field of Search ........... 152/209 B, 209 R, 209 D; D12/136, 140, 147, 149, 150, 151

[56] References Cited

U.S. PATENT DOCUMENTS

| D. 67,669 | 6/1925 | Merriman | 152/209 D |
| D. 112,185 | 11/1938 | Anderson | 152/209 D |
| 4,194,548 | 3/1980 | Roger | 152/209 R |
| 4,222,424 | 9/1980 | Tsuzura et al. | 152/209 B |
| 4,641,696 | 2/1987 | Semin et al. | 152/209 R |
| 4,700,762 | 10/1987 | Landers | 152/209 R |
| 4,823,855 | 4/1989 | Goergen et al. | 152/209 R |

FOREIGN PATENT DOCUMENTS

| 202060 | 7/1958 | Fed. Rep. of Germany | 152/209 R |
| 63-90405 | 4/1988 | Japan | 152/209 D |
| 495649 | 11/1938 | United Kingdom | 152/209 R |
| 1254766 | 11/1971 | United Kingdom | 152/209 R |

*Primary Examiner*—Michael W. Ball
*Assistant Examiner*—Mark A. Osele
*Attorney, Agent, or Firm*—Birch, Stewart, Kolasch & Birch

[57] ABSTRACT

An ATV tire is disclosed which has a plurality of blocks on the tread which extend from one side to another side of said tread in a zig-zag manner form and are spaced apart circumferentially, each of the blocks including a center region C1, middle regions C2, C2, side regions S1, S1 and shoulder regions S2, S2, the center region C1 extending in an axial direction symmetrically about the equator of the tire and having a cut-off portion G therein, the middle regions C2, C2 and the side regions S1, S1 forming a V-shaped bending portion, and the shoulder regions S2, S2 extending axially. The ATV tire is used on the ATV which can run on both rough land and water. When the ATV runs on rough road, the strong traction is attained by such blocks. When running on water, the blocks function as so called of water wheel to blades to attain strong propulsion especially due to the V-shaped bending portion.

16 Claims, 3 Drawing Sheets

ATV TIRE WITH ZIG ZAG LUGS

The present invention relates to an ATV tire suitably adapted for an ATV which can run both on the rough land and on water.

An ATV, that is, an all terrain vehicle which can freely run on rough land as well as on water by floating on water was proposed by the inventor of the present invention U.S. patent application No. 223,940 filed in 1988.

The propulsion power on water of the ATV is obtained by the rotation of the ribs on the tread, but an ordinary ATV tire which is intended to run on the land can not achieve enough propulsion on water from the nature of its construction.

It is an object of the present invention to provide a novel ATV tire which is available for an ATV which runs both on water and on rough land.

Another object of the invention is to provide a novel tire having a plurality of lugs extending axially in a zig-zag manner.

According to one aspect of the present invention, an ATV tire has a plurality of lugs which are extending continuously from one side to another side of the tread in the axial direction in a zig-zag manner and are spaced apart circumferentially, each of the lugs comprises a center region C1, middle regions, also called inner oblique portions, C2, C2, side regions, also called outer oblique portions, S1, S1 and shoulder regions S2, S2, the center region C1 extends in the axial direction symmetrically with respect to the equator of the tire and has a cut-out portion G therein, the middle regions C2 are arranged at both sides of the center region C1 and are symmetrically at an angle, the side regions S1 are arranged at both sides of the middle regions C2, and incline at a reverse angle with the middle regions C2, and the shoulder regions S2 are arranged at both sides of the side regions S1 and extend outwardly in the an axial direction.

Further, under the condition of normal load and standard inner pressure of the tire mounted on a standard rim, the middle width WC2 is set to be 0.25 to 0.65 times the axial land-contact width WT of the tread, the center width WC1 is set to be 0.25 to 0.65 times the middle width WC2, and the axial cut-out width WG of the cut-out portion G is 0.4 to 0.6 times that of the center width WC1.

An embodiment of the present invention will now be described in detail by way of example only with reference to the drawings, in which.

Figure 1:
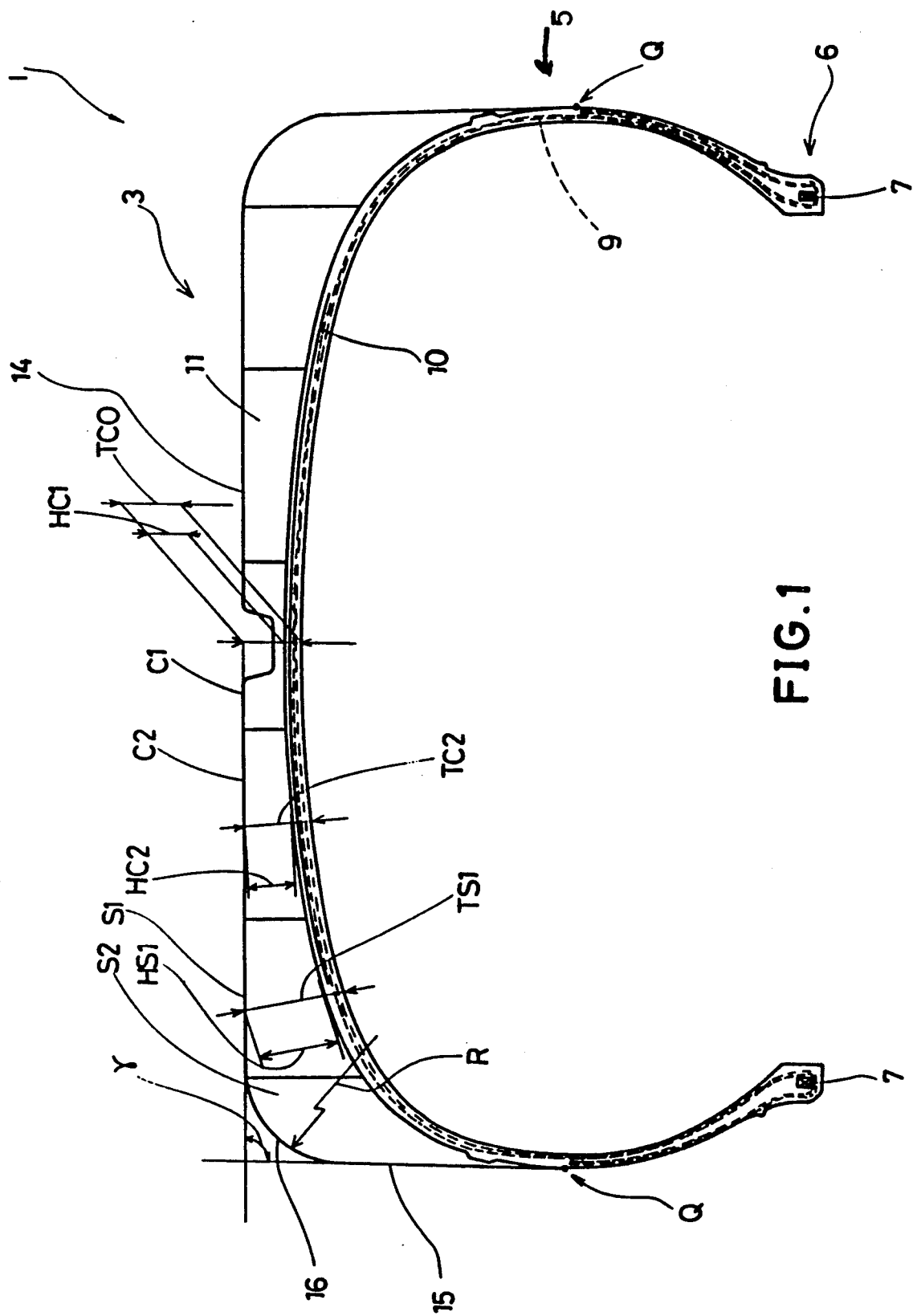
FIG. 1 is a sectional view showing an embodiment of the invention.

In the FIGS. 1 and 2, the ATV tire (hereinafter referred to as a tire) is a low profile tire of which the aspect ratio is 0.9 to 0.6 and is inflated under relatively low inner pressure, such as 0.1 to 1.0 kgf/sq. cm.

The tire 1 comprises a tread 3, sidewalls 5, 5 extending radially inwardly from each tread edge to bead regions 6, 6. The tire is equipped with a toroidal carcass 9 passing through the tread 3, the sidewalls 5, 5, the bead regions 6, 6 and wrapped at each edge from inside to outside around the bead cors 7, 7, and a braker 10 embedded at the tread 3 outside the carcass 9.

The carcass 9 is composed of at least one ply, and in the example, two plies and the wrapped portions terminate at the position where the width of the tire is maximum.

The carcass 9 is of a cross ply construction in which the parallel cords in each ply intersect each other. The carcass cords are laid at the same angle ranging from 30 degrees to 60 degrees, thereby evenly reinforcing the lateral rigidity of the tire. The cords are made of textile fibres, such as nylon, polyester, rayon and the like.

The braker 10, in the example, comprises one ply containing breaker cords laid at about the same angle as the carcass cords and arranged in the range from 0.6 to 0.9 times the tread width, and being centered on the equator CO of the tire. Thereby, the braker 10 increases the rigidity of the tread, resulting in that the contact pressure the ground is made even, maintaining the ride comfort and preventing uneven wear lug chipping and the like. The braker cords may employ the same cords as those of the carcass 9.

On the tread surface of the tread 3, there is formed with a tread pattern 12 having lugs 11 which extend from one side to another side of the tread 3 in an axial direction, circumferentially spaced apart a distance of pitch P of 0.01 to 0.05 times the circumferential length of the tire.

In the case that the pitch P is less than 0.01 times, the number of lugs becomes too many to obtain the effective propulsion ability. On the other hand, when it is over 0.05 times, such a tire is poor in propulsion ability as a whole, in addition, the ride comfort becomes poor due to vibration caused by the lug arrangement.

Figure 2:
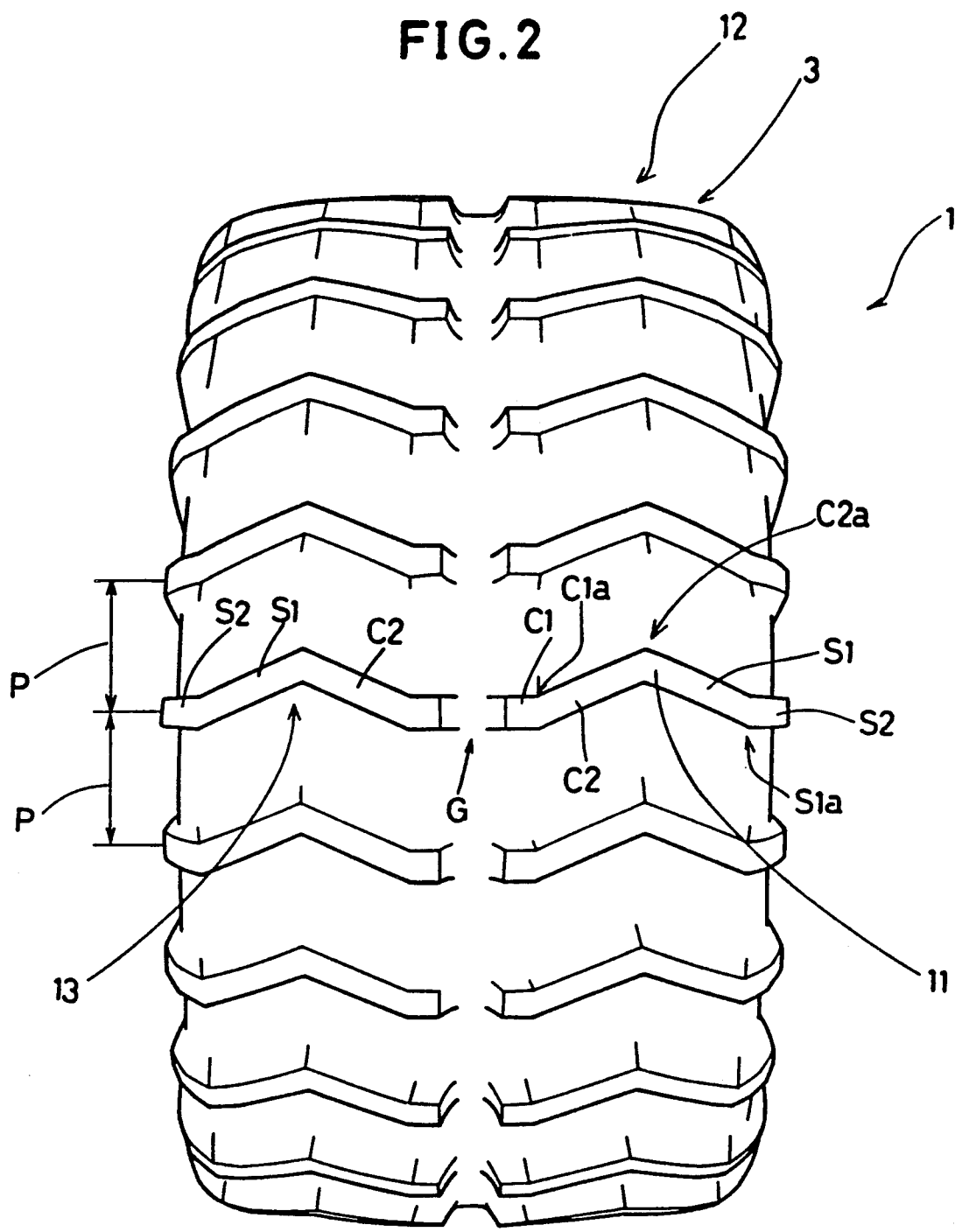
FIG. 2 is a plan view thereof.
Figure 3:
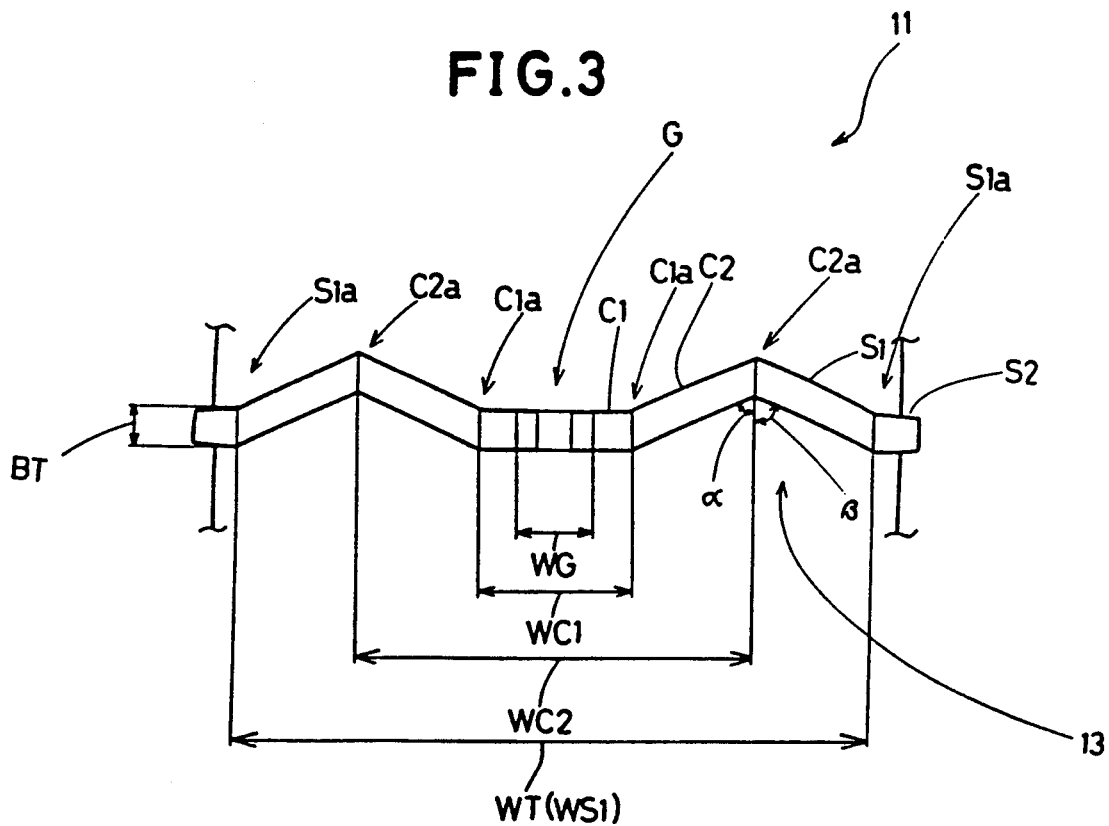
FIG. 3 is an enlarged plan view showing lug.

Each of the lugs 11, as shown in FIGS. 2, 3, comprises a center region C1 extending in the axial direction centered at the equator, middle regions C2, C2 arranged at both sides of the center region C1, side regions S1, S1 arranged at both sides of the middle regions C2, C2 and shoulder regions S2, S2 arranged at both sides of the side regions S1, S1.

The center region C1 is formed with a cut-out portion G at the axial center thereof.

The two middle regions C2, C2 are connected at each axial outer end C1a of the center region C1 and lie at an angle (alpha) inclining to the kick-out side (rear side) ranging from 20 degrees to 80 degrees with respect to the equator, symmetrically about the equator.

The two side regions S1, S1 are connected to each axial outer end C2a of the middle regions C2, C2 and lie at the reverse angle (beta) inclining to the step-in side (front side) ranging from 20 degrees to 80 degrees with respect to the equator of the tire, symmetrically about the equator.

The two shoulder regions S2 are connected to each axial outer end S1a of the side regions S1, S1 and extend axially outwardly. A buttress portion 15, that is the outer side of the shoulder regions S1, S1, in the example, terminates about at the point where the axial width of the tire is maximum.

The lug 11, as shown in FIG. 1, is provided with a wide ground-contact surface 14 which is in a flat plane. The ground-contact surface 14 and the buttress portion 15 intersect at an angle of ranging from 80 degrees to 100 degrees, and the corner portion is rounded by an arc 16 with a radius of curvature of 10 to 40 mm, thereby increasing the cornering performance.

The lug height is gradually increased towards the ends of the tread 3, in such a way that the height HC1 of the center region C1 is 0.75 to 0.85 times the total thickness TC0 of the tread 3 at the equator, the height HC2 of the middle region C2 is 0.80 to 0.95 times the total thickness TC2 at the axial center point of the middle region C2, and the height HS1 of said side region S1 is 0.85 to 0.95 times the total thickness TS1 at the axial center point of the side region S1, by which an effective propulsion is achieved.

Such lugs 11 extending axially have an excellent traction performance and an improved running performance on rough land, owing to the drainage and earth-removing properties, by the grooves formed between lugs 11, 11 and a cut-out portion G. Further in the water, higher propulsion is achieved, due to the water-catching properties, exhibited mainly by the V shaped bending portion 13 composed of the middle region C2 and the side region S1. Furthermore, by the flow of water through the cut-out portion G towards the kick-out side, the straight running stability in water is increased. In the case that the lugs 11 are arranged symmetrically about the equator, the straight running stability is further improved.

Moreover, the aforesaid angles (alpha) and (beta) at the bending portions 13 are set to be in the ranges of 20 degrees to 80 degrees, more preferably to be in the range of 50 degrees to 80 degrees.

In the case that these angles are over 80 degrees, the water-catching properties become unsufficient, and when the angles are under 20 degrees, the bending portion 13 becomes filled with earth, mud and the like, so that the grip performance thereof is deteriorated.

The middle width WC2 between the axial outer ends C2a, C2a of the middle region C2 is 0.25 to 0.65 times the ground-contact surface width WT, the center width WC1 between the axial outer ends C1a, C1a of the center region C1 is to be 0.25 to 0.65 times the middle width WC2 and the cut-out width WG of the cut-off portion G is to be 0.40 to 0.60 times the center width WC1. Further, in the embodiment, the side width WS1 which is the distance between the axial outer ends S1a, S1a is set to be the same width as the ground-contact width WT, in the embodiment.

In the case that the middle width WC2 is over 0.65 times the ground contact width WT or under 0.75 times the width WT, or the center width WC1 is over 0.65 times the middle width WC2, the propulsion, running and steering stability and the like deteriorate since the middle regions C2 or the side regions S1 become too short or too long relative to each other and the bending portions 13 become asymmetric. It is preferable in order to obtain the a foresaid properties to make the bending portion 13 symmetric about the apex, that is the axial outer end C2a. In the case of the center width WC1 being under 0.25 times the middle width WC2, the cut-out width WG becomes short, resulting in that the properties, such as straight running stability, drainage and earth-taking-off become deteriorated.

Accordingly, from such view points, it is preferable that the middle width WC2 is 0.40 to 0.65 times the ground-contact width WT and center width WC1 is 0.25 to 0.50 times the middle width WC2.

The widths WT, WC1, WC2 and WG are values measured along a straight line in the axial direction. The ground-contact width is defined as an axial length of the tread 3 contacting the ground, with the condition that the tire is mounted on a standard rim and inflated to a normal inner pressure under standard load.

Figure 4:
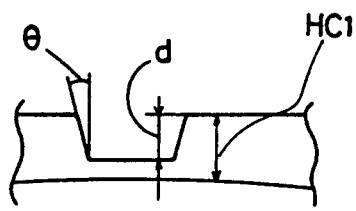
FIG. 4 is a partial cross sectional view showing a cut-out portion of the lug.

As for the cut-out portion G, the cut-off width WG is 0.4 to 0.6 times the center width WC1, as mentioned before, and, a ratio of 0.45 to 0.55 is more preferable. The depth (d) of the cut-out portion G, as shown in FIG. 4, is preferably to be 1 to 0.8 times the height HC1 of the center region C1. Also, both side surfaces of the cut-out portion G in the axial plane preferably incline at an angle (r) ranging from 10 degrees to 35 degrees with respect to a radial line.

The width BT of the lug 11 which is a length in the circumferential direction of the tire is preferably constant through the full length of the blocks in order to increase the general endurance of the tire and to prevent the partial deficit of the lug 11. The width is preferably about 5 to 30 mm. And also it is preferable to join the wall of the lug 11 to the groove base with a smooth arc and to provide some reinforcing ribs connecting the lugs 11, 11 to increase the endurance.

The ATV tire constructed as previously mentioned, when it runs on ground, attains strong traction because of the lugs. Additionally, owing to the lateral grooves between the lugs and the cut-out portions, the drainage and earth-removing performances are improved.

When running on water, the lugs function as so-called water wheel blades to attain strong propulsion especially due to the V-shaped bending region of the middle regions C2 and the side regions S1 and the shoulder regions S2. Also, the cut-out-portion increases the straight running performance.

Further, in the case that the lugs are arranged symmetrically about the equator of the tire, straight running performance and running stability are increased on both water and ground. As shown in the embodiment, the even width of the lug removes the partial weakness in strength of the lugs so that the durability thereof can be increased.

I claim:

1. An all terrain vehicle tire having a tread provided with a plurality of lugs arranged circumferentially of the tire;
    each lug symmetrical with respect to the tire equator extending continuously from one axial edge to the other axial edge of the tread in a zigzag manner;
    each lug comprising:
    a pair of axially inner oblique portions located one on each side of the tire equator,
    a pair of axially outer oblique portions each located axially outward of each inner oblique portion,
    a central portion located in the center of the tread between said inner oblique portions, and
    a pair of shoulder portions each located axially outward of each outer oblique portion;
    each inner oblique portion extending from each of the axially outer ends of the central portion in a direction at an angle of from 20 to 80 degrees with respect to the tire equator;
    each outer oblique portion extending from the axially outer end of the inner oblique portion in a reverse direction, to that of the inner oblique portion, at an angle of from 20 to 80 degrees with respect to the tire equator;
    each shoulder portion extending in the axial direction of the tire from the axially outer end of each outer oblique portion to the tread edge;

said central portion extending in the axial direction of the tire and provided with a cut-out portion in the middle thereof;

the first axial width (WC2) between the axially outer ends of the inner oblique portions being in the range of 25 to 65% of the second axial width (WT) of the ground contacting region of the tread when the tire is mounted on a standard rim and inflated to a standard pressure and loaded with a normal load;

the third axial width (WC1) of the central portion being in the range of 25 to 65% of said first axial width (WC2);

the fourth axial width (WG) of said cut-out portion being in the range of 40 to 60% of said third axial width (WC1); and the radial depth (d) of the cut-out portion being in the range of 80 to 100% of the height (HC1) of the central portion.

2. The tire according to claim 1, wherein the width (BT), in the circumferential direction of the tire, of each lug is constant over all of the lug.

3. The tire according to claim 1, wherein the height (HC1) of the central axial portion is in the range of 75 to 85% of the total thickness (TCO) of the tread at the tire equator, the height (HC2) of the inner oblique portions is in the range of 80 to 95% of the total thickness (TC2) of the tread at the center point thereof, and the height (HS1) of the outer oblique portions is in the range of 85 to 95% of the total thickness (TS1) of the tread at the center point thereof.

4. The tire according to claim 1, wherein said oblique angles of the inner and outer oblique portions are in the range of 50 to 80 degrees with respect to the tire equator.

5. The tire according to claim 1, wherein said first axial width (WC2) is in the range of 40 to 65% of said axial ground contacting width (WT), and said third axial width (WC1) is in the range of 25 to 50% of said first axial width (WC2).

6. The tire according to claim 1, wherein said fourth axial width (WG) of the cut-out portion is in the range of 45 to 55% of said third axial width (WC1).

7. The tire according to claim 1, wherein said cut-out portion has sidewalls inclined at an angle of 10 to 35 degrees to the radial direction.

8. The tire according to claim 1, wherein the width (BT), in the circumferential direction of the tire, of each lug is in the range of 5 to 30 mm.

9. The tire according to claim 1, wherein the pitches of the circumferential arrangement of the lugs are in the range of 1 to 5% of the circumference of the tire.

10. An all terrain vehicle tire having a tread provided with a plurality of lugs arranged circumferentially of the tire;

each lug symmetrical with respect to the tire equator extending continuously from one axial edge to the other axial edge of the tread in a zigzag manner;

each lug comprising:

a pair of axially inner oblique portions located one on each side of the tire equator, a pair of axially outer oblique portions each located axially outward of each inner oblique portion, a central portion located in the center of the tread between said inner oblique portions, and a pair of shoulder portions each located axially outward of each outer oblique portion;

each inner oblique portion extending from each of the axially outer ends of the central portion in a direction at an angle of from 20 to 80 degrees with respect to the tire equator;

each outer oblique portion extending from the axially outer end of the inner oblique portion in a reverse direction, to that of the inner oblique portion, at an angle of from 20 to 80 degrees with respect to the tire equator;

each shoulder portion extending in the axial direction of the from the axially outer end of each outer oblique portion to the tread edge;

said central portion exending in the axial direction of the tire and provided with a cut-out portion in the middle thereof;

the first axial width (WC2) between the axially outer ends of the inner oblique portions being in the range of 25 to 65% of the second axial width (WT) of the ground contacting region of the tread when the tire is mounted on a standard rim and inflated to a standard pressure and loaded with a normal load;

the third axial width (WC1) of the central portion being in the range of 25 to 65% of said first axial width (WC2);

the fourth axial width (WG) of said cut-out portion being in the range of 40 to 60% of said third axial width (WC1); and the radial depth (d) of the cut-out portion being in the range of 80 to 100% of the height (HC1) of the central portion;

wherein the height (HC1) of the central axial portion is in the range of 75 to 85% of the total thickness (TCO) of the tread at the tire equator, the height (HC2) of the inner oblique portions is in the range of 80 to 95% of the total thickness (TC2) of the tread at the center point thereof, and the height (HS1) of the outer oblique portions is in the range of 85 to 95% of the total thickness (TS1) of the tread at the center point thereof.

11. The tire according to claim 10, wherein said oblique angles of the inner and outer oblique portions are in the range of 50 to 80 degrees with respect to the tire equator.

12. The tire according to claim 10, wherein said first axial width (WC2) is in the range of 40 to 65% of said second axial width (WT), and said third axial width (WC1) is in the range of 25 to 50% of said first axial width (WC2).

13. The tire according to claim 10, wherein said fourth axial width (WG) of the cut-out portion is in the range of 45 to 55% of said third axial width (WC1).

14. The tire according to claim 10, wherein said cut-out portion has sidewalls inclined at an angle of 10 to 35 degrees to the radial direction.

15. The tire according to claim 10, wherein the width (BT), in the circumferential direction of the tire, of each lug is in the range of 5 to 30 mm.

16. The tire according to claim 10, wherein the pitches of the circumferential arrangement of the lugs are in the range of 1 to 5% of the circumference of the tire.

* * * * *